Feb. 27, 1962 R. R. HASTY 3,023,020
FOLDING OR KNOCK-DOWN GOLF CART
Filed May 23, 1960 2 Sheets-Sheet 1

INVENTOR.
ROBERT R. HASTY
BY
Baldwin & Wright
ATTORNEYS

Feb. 27, 1962 — R. R. HASTY — 3,023,020
FOLDING OR KNOCK-DOWN GOLF CART
Filed May 23, 1960 — 2 Sheets-Sheet 2

INVENTOR.
ROBERT R. HASTY
BY Baldwin & Wight
ATTORNEYS

United States Patent Office 3,023,020
Patented Feb. 27, 1962

3,023,020
FOLDING OR KNOCK-DOWN GOLF CART
Robert R. Hasty, 2144½ N. Broadway, Wichita 2, Kans.
Filed May 23, 1960, Ser. No. 30,899
8 Claims. (Cl. 280—36)

This invention relates to a folding or knock-down golf cart.

An important object of the invention is to provide a novel device of this character which is highly convenient for use in transporting a bag of clubs over a golf course, and which is capable of having certain parts thereof folded to compact smaller dimensions to permit the carrying of the device when desired.

A further object is to provide a golf cart of such novel structure that, in addition to substantially folding the device for carrying by hand, the major parts of the device may be knocked down into separate units to render the device particularly compact for storage and shipping.

A further object is to provide a device of this character having novel detachable elements readily connectible to each other to form an effective type of chassis for the device, certain parts of which are readily disconnectible for the carrying of the device by hand and other parts of which may be readily disconnected from each other to facilitate the compact storage of the device.

A further object is to provide a golf cart having a main tubular shaft projecting upwardly from the chassis and provided with a handle bar having a relatively short end normally received in the upper end of the tubular shaft and a relatively long end having a rubber hand grip on the end thereof, and which hand grip may be removed for the reversal of the handle bar whereby the longer end thereof is receivable in the upper end of the tubular shaft to increase the compactness of the device when the latter is to be carried or stored.

A further object is to provide the device with a novel type of wheel or axle mounting whereby the wheels are readily demountable when the device is to be stored.

A further object is to provide the device with straps adapted to surround and secure in position a golf club bag to be transported by the device, and which straps are spaced apart a distance equal to the width of the tread of the supporting wheels so that the latter with their axle may be separated from the remainder of the chassis and secured in position relative to the tubular shaft for the transporting of the device by hand, the tubular shaft being used as a handle.

A further object is to provide novel readily disconnectible means for securing the axle positioned relative to other portions of the chassis, and to provide means for detachably securing to the latter the tubular shaft referred to above.

Other objects and advantages will become apparent during the course of the following description.

In the drawings I have shown one embodiment of the invention. In this showing:

Figure 1:
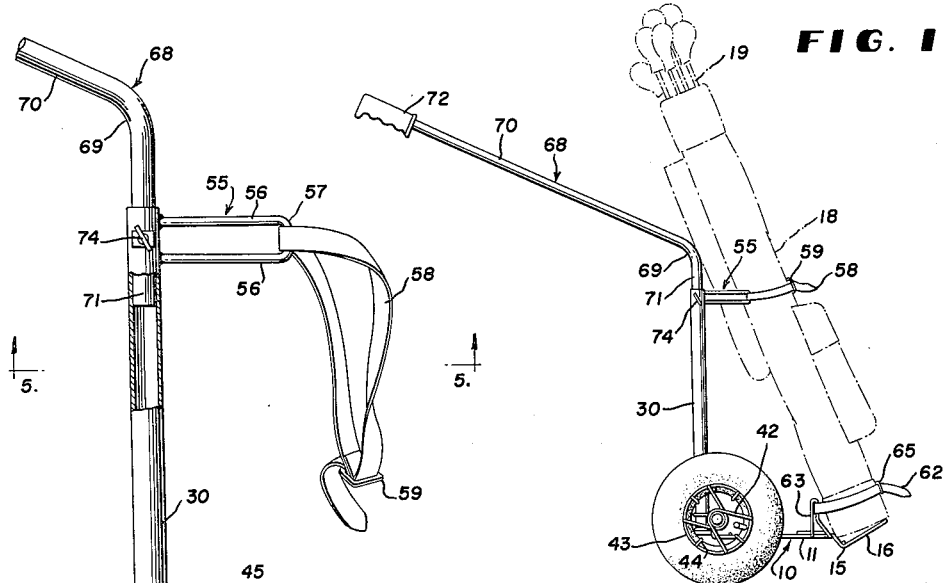
FIGURE 1 is a side elevation of the assembled device, a golf bag and clubs being shown in broken lines in position thereon.
Figure 2:
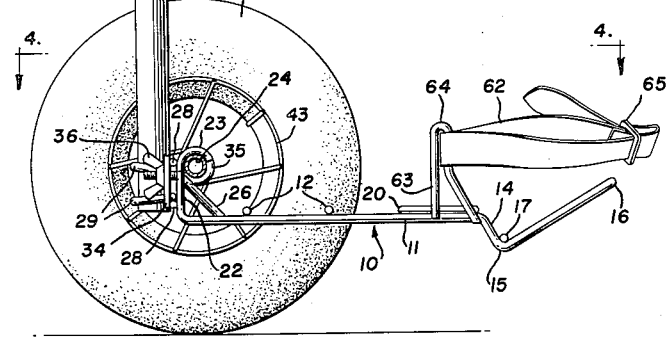
FIGURE 2 is a fragmentary side elevation of the device, parts being omitted and broken away and parts being shown in section.
Figure 2:
Figure 3:
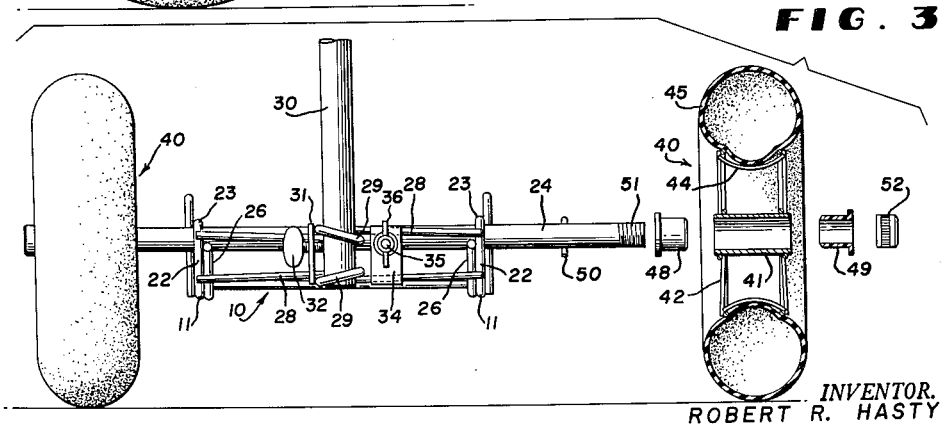
FIGURE 3 is a rear elevation of the device, one of the wheels and associated elements being shown in section and separated from the supporting axle.

Referring to the drawings, the numeral 10 designates a supporting frame as a whole normally arranged near the bottom of the device as shown in FIGURES 1, 2 and 3. This frame comprises side bars 11 connected by preferably two transverse braces 12 welded at their ends to the side bars 11.

Figure 4:
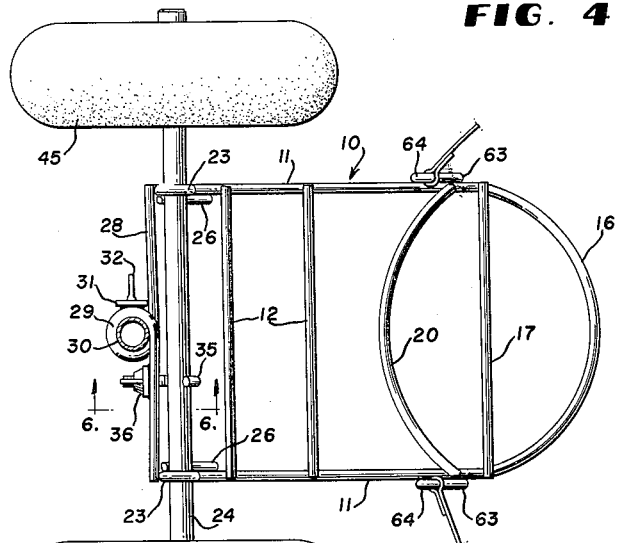
FIGURE 4 is a section on line 4—4 of FIGURE 2.

Adjacent their forward ends, the side bars are inclined downwardly as at 14 and then bend at an angle as at 15, and the forward ends of the side bar members are connected by a substantially semicircular loop 16 (FIGURE 4). In the angle formed by the bend 15 is arranged a transverse brace 17 welded at its ends to the side frame members 11. The bar 17 and loop 16 form a support for the lower end of a golf bag 18 carrying the usual assortment of clubs 19 (FIGURE 1). The lower end of the bag is adapted to nest within a curved cross member 20 (FIGURE 4) welded at its ends to the side bars 11.

The rear ends of the side bars 11 extend upwardly as at 22, and the upper ends of such extensions are bent substantially semicircularly as at 23. The bent ends 23 are adapted to receive therein a tubular axle 24, as shown in FIGURE 2, such axle being further described below. The extremities of the bent ends 23 preferably terminate slightly above the axis of the axle 24 for the ready removal of the latter from the hooks formed by the bent ends 23. Short braces 26 extend between and are welded at their ends to the side bars 11 and the upstanding elements 22.

Referring to FIGURE 3, a pair of transverse bars 28 are welded at their ends to the upstanding portions 22 of the side bars. Intermediate its ends, each cross bar 28 is coiled to provide a substantially circular loop 29. These loops form a socket to receive the lower end of a tubular shaft 30, open from end to end for a reason which will become apparent. A plate 31 extends across the loops 29 and is welded at its ends thereto and carries a thumb screw 32, the stem of which is engageable with the tubular shaft 30 to fix the latter in the normal position shown in FIGURES 2 and 3.

Figure 6:
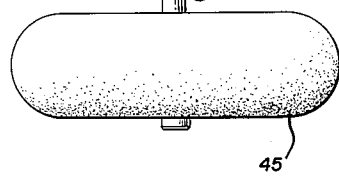
FIGURE 6 is a similar view on line 6—6 of FIGURE 4.

To one side of the loops 29 (FIGURE 3) another plate 34 is welded to the cross bars 28 and slidably supports a hook bolt 35 projecting forwardly of the plate 34 and adjustable by a wing nut 36 behind the plate 34. The hook of the bolt 35 opens substantially in the opposite direction to the hooks 23 and is adapted to cooperate with the hooks 23 (FIGURE 2) to clamp the axle 24 in position. Referring to FIGURE 6, the hook bolt 35 has its shank stamped to provide a lug 37 to prevent the hook end of the bolt from sliding through the opening in the plate 34 when the parts are disassembled, thus preventing the loss of the hook bolt 35.

A wheel structure indicated as a whole by the numeral 40 is mounted on each end of the axle 24. Each wheel comprises a tubular hub 41 (FIGURE 3) about which are looped, as shown in FIGURE 1, rigid heavy steel wire spokes 42. Obviously, these spokes have looped inner ends surrounding the hub 41, while the free ends of the spokes diverge radially outwardly. These spokes at each side of each wheel are welded at their outer ends to rigid steel wire circular members 43 between which are welded transverse rigid steel wire rim elements 44 (FIGURE 3). A tire 45 surrounds the rim elements 44 of each wheel and may be of any desired inflatable type with or without a grooved tread structure. Obviously, each tire readily may be placed in position on its wheel while deflated and when inflated will be effectively held in position on the wheel.

Within the tubular hub of each wheel are arranged oppositely facing thimbles 48 and 49 flanged at their remote ends as shown in FIGURE 3. These thimbles serve as bearing members and may be made of nylon or any other suitable molded plastic, although it will be apparent that they may be made of brass or other metal, if desired. The free ends of the thimbles are slidable in each hub 41 and they are also slidable on the axle 24. Spaced from each end of the axle is a cotter pin 50 extending therethrough and acting as a seat for the flange of the thimble 48. Each end of the shaft is threaded as at 51 to be received in a wheel attaching nut 52. Obviously, the thimbles 48 and 49 are inserted in the tubular hubs 41, whereupon the latter are placed in position on the adjacent ends of the axle 24 and the nuts 52 are applied to hold the elements in assembled positions. This provides a very readily demountable wheel structure for a purpose to be described.

Figure 5:
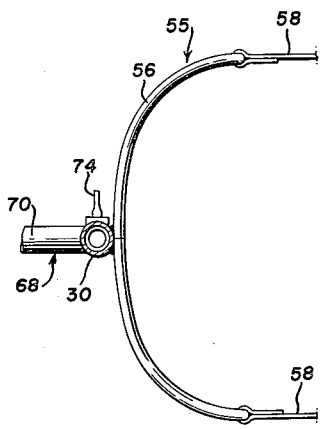
FIGURE 5 is a fragmentary sectional view on line 5—5 of FIGURE 2.

A golf bag receiving yoke 55 is mounted adjacent the upper end of the tubular shaft 30. This yoke comprises spaced bars 56 bent generally in the form shown in FIGURE 5, and the ends of the yoke remote from the shaft 30 are looped as at 57 to be received in the ends of an attaching strap 58 having a tightening buckle 59. The yoke 55 may be formed of a single piece of rigid steel wire or bar the ends of which may terminate forwardly of the shaft 30, as shown in FIGURE 5, and are welded to the shaft 30.

The strap 58 cooperates with a lower strap 62 to hold a golf bag in position and to serve an additional purpose to be referred to. A rigid strap retaining member 63 has its lower ends welded to each of the side bars 11, the upper ends of the members 63 being looped as at 64 for the attachment of the adjacent ends of the strap as shown in FIGURE 4. The strap 62 is provided with a tightening buckle 65, and the two straps 58 and 62 are adapted to pass around the golf bag 18 as shown in FIGURE 1. The attachments of these straps to the members 55 and 63 are spaced apart a distance approximately equal to the tread of the tires 45 for a purpose to be described.

Referring to FIGURES 1 and 2, the numeral 68 designates a handle bar as a whole, curved intermediate its ends as at 69 to form relatively long and short ends 70 and 71, respectively. The long end 70 normally carries at its extremity a rubber or other resilient grip 72. The handle bar 70 is of preferably tubular stock and is of uniform cross sectional diameter from end to end and has its external diameter corresponding to the internal diameter of the tubular shaft 30 for the insertion of either end of the handle bar in the latter as further described below. The short end 71 of the handle bar is normally inserted in the shaft 30 and is held in such position by a thumb screw 74 having threaded engagement with the shaft 30.

*Operation*

The parts are normally assembled as shown in FIGURES 1 and 2, and the use of the cart around a golf course will be obvious. The bag 18 has its lower end seating on the bar 17 and loop 16, and the inward movement of the lower end of the bag toward the wheels of the device is limited by the cross loop 20. While the shaft 30 has been shown in vertical position in FIGURES 1 and 2 for convenience in illustrating, it will be apparent that it normally will be tilted upwardly to the left, thus placing the center of gravity of the load carried by the cart substantially vertically above the axis of the wheels 40. The cart is moved by pulling it behind the user, who grasps the grip 72 for this purpose. When it is desired to withdraw a club from the bag, the grip 72 will be swung to the right in FIGURE 2, whereupon the loop 16 will come to rest on the ground to limit turning movement of the cart, which will then be self-supporting.

Figure 7:
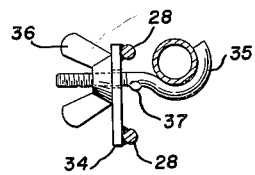
FIGURE 7 is a side elevation of the device folded to be carried by hand, a portion of the handle bar being broken away.
Figure 7:
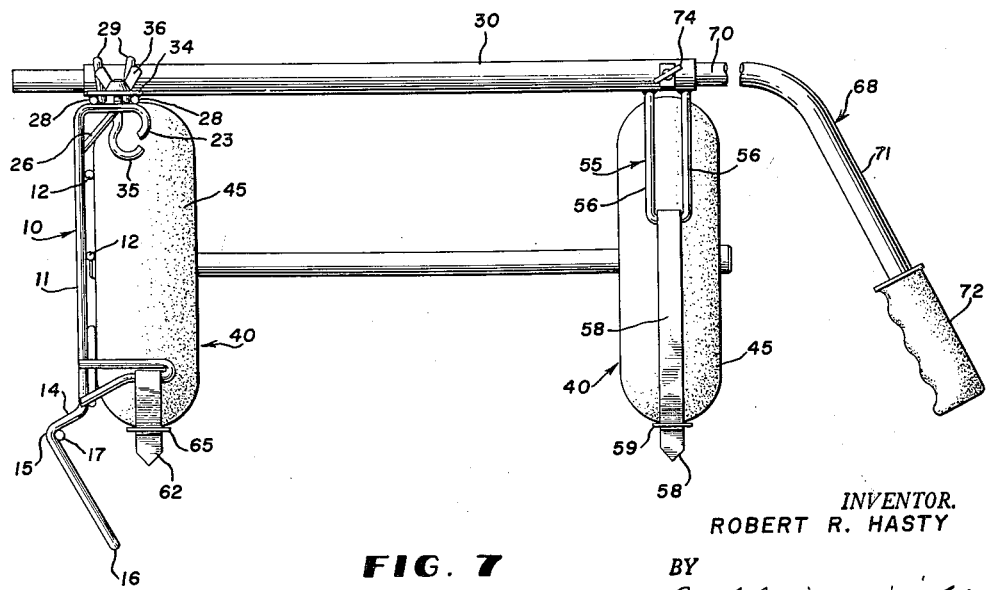

In carrying the device to and from the golf course it is convenient to fold it as shown in FIGURE 7. For this purpose the short end 71 of the handle bar will be withdrawn from the shaft 30 after loosening the thumb screw 74. The grip 72 is then removed from the long end of the handle bar and placed in position on the short end thereof as shown in FIGURE 7, whereupon the long end 70 is inserted through the shaft 30 and may project from the other end thereof. The handle bar is fixed in such position by tightening the thumb screw 74. When the handle bar is thus assembled for carrying purposes, the short end 71 is turned 180° from the position of the long end 70 in FIGURE 1 so that the short end overlies the yoke 55.

The wing nut 36 is then unscrewed to release the hook of the bolt 35 from the axle 24, whereupon the latter may be removed from the hooks 23. The whole wheel assembly is then placed in position as shown in FIGURE 7, one wheel lying against the cross bars 12, in which case the adjacent wheel will be substantially centered relative to the strap 62, while the other wheel will be substantially centered relative to the strap 58. These straps then may be passed around the tires 45 and tightened, whereupon the parts of the device will all assume the positions shown in FIGURE 7. The tubular shaft 30 then becomes a horizontal handle for carrying the device. Thus the elements of the device are well compacted for carrying, and only a few very simple operations must be carried out to so assemble the elements.

If it is desired further to disassemble the elements so that they take up a minimum space for storage and shipment, other simple operations may be performed for this purpose. For example, the thumb screw 32 (FIGURE 3) may be loosened and the shaft 30 removed from the loops 29. Each nut 52 may be removed from the axle 24, whereupon the wheels will be removed, the thimbles 48 and 49 re-assembled on the axle, and the nuts 52 re-applied on the axle. In such case, the axle 24 and shaft 30 may be placed side by side and the wheels 40, being completely removed from the axle, may be assembled with relation to the other elements in any desired manner. The parts thus disassembled require very little storage space. The axle will be detached from the frame 10, of course, and the frame, axle and tubular shaft may lie one on top of the other.

From the foregoing it will be apparent that the present device is simple in construction and may be assembled and disassembled with the greatest possible facility and in a limited amount of time. The device folded as in FIGURE 7 readily may be placed in the trunk of an automobile. Where such receptacle carries a substantial number of articles such as packages and suitcases, the device may be completely disassembled, as described above, to take up a limited amount of space.

The construction as shown embodies the invention in a preferred form, but it is intended that the disclosure be illustrative rather than definitive, the invention being defined in the claims.

I claim:

1. A golf cart comprising a frame including a supporting portion at one end thereof on which the lower end of a golf bag is adapted to rest, a pair of transversely spaced open hooks carried by the other end of said frame and opening in the same direction, an axle normally arranged in said hooks and provided with wheels at the ends thereof outwardly of said frame, a clamping member carried by said frame intermediate said hooks, said clamping member having a hook opening oppositely to said pair of hooks and engageable with said axle to clamp it in position with respect to said pair of hooks and releasable to release said axle from said pair of hooks, a supporting shaft fixed at its lower end to said frame and having a golf bag receiving yoke fixed to its upper end over said frame, and straps provided with tightening buckles carried respectively by said yoke and by the supporting portion of said frame to encircle a golf bag, and a handle bar carried by and projecting upwardly and rearwardly from said shaft.

2. A golf cart according to claim 1 wherein said straps are spaced apart a distance equal to the space between the treads of said wheels whereby, upon removal of said shaft from said pair of hooks, said axle may be turned upwardly substantially parallel to said shaft with the lower wheels supported on said frame and with said straps positioned and tightened around the respective wheels.

3. A golf cart according to claim 1 wherein said frame has portions formed of rigid bar material, two portions of which extend upwardly parallel to each other and have their upper ends bent to form said first-named hooks.

4. A golf cart according to claim 1 wherein said frame has portions formed of rigid bar material, two portions of which extend upwardly parallel to each other and have their upper ends bent to form said first-named hooks, a pair of parallel vertically spaced rigid bars extending across and secured at their ends to said upstanding bar portions and bent intermediate their ends to form loops receiving the lower end of said shaft, and a fastening element carried by said loops and engageable by said shaft to fix it in position relative to said frame, said fastening element being releasable for the sliding of the lower end of said shaft from said loops.

5. A golf cart according to claim 1 wherein said frame has portions formed of rigid bar material, two portions of which extend upwardly parallel to each other and have their upper ends bent to form said first-named hooks, a pair of parallel bars extending across said frame and fixed at their ends to said upstanding bar portions, and a plate fixed to said parallel bars, said clamping member comprising a hook bolt having a threaded shank extending through said plate, and a wing nut threaded on said shank.

6. A golf cart according to claim 1 wherein said frame has portions formed of rigid bar material, two portions of which extend upwardly parallel to each other and have their upper ends bent to form said first-named hooks, a pair of parallel bars extending across said frame and fixed at their ends to said upstanding bar portions, and a plate fixed to said parallel bars, said clamping member comprising a hook bolt having a threaded shank extending through said plate, and a wing nut threaded on said shank, said parallel bars being circularly looped intermediate their ends to form a socket slidably receiving the lower end of said shaft, and a thumb screw carried by said loops and engageable with the lower end of said shaft to fix it in position with respect to said frame, the loosening of said thumb screw releasing said shaft for withdrawal from said loops.

7. A golf cart comprising a lower frame formed of spaced rigid longitudinal bars, cross bars extending between and secured to said longitudinal bars, said longitudinal bars at one end of said frame being connected by a substantially semicircular integral loops, and a cross member connected between said longitudinal bars at the ends of said loop, said cross member and said loop forming a support for the lower end of a golf club bag, said longitudinal bars at the other end of said frame having upwardly extending integral portions terminating at their upper ends in integral open hooks, an axle extending transversely of said frame and arranged in said hooks and having wheels at opposite ends thereof outwardly of said frame, connecting means between said upwardly extending portions of said frame, a releasable clamping device carried by said connecting means and having a hook opening opposite to the opening of said first-named hooks and receiving said axle to clamp the latter in said first-named hooks whereby, upon releasing said clamping device, said axle will be released from said first-named hooks, an upwardly extending supporting member secured at its lower end to said connecting means, a handle bar connected to the upper end of said supporting member, and means comprising a strap carried by the upper end of said supporting member to embrace a golf bag.

8. A golf cart according to claim 7 provided with a strap loop fixed and extending upwardly from each of said longitudinal bars, and a lower strap passing through said strap loops and adapted to surround the lower end portion of a golf bag, each of said straps being provided with a tightening buckle, said straps being spaced apart a distance approximately equal to the tread of said wheels, whereby when said axle is released from said first-named hooks, said axle may be arranged in an upwardly extending position with a lower wheel resting on said frame and with said wheels lying in a position to be surrounded and clamped by the respective straps.

References Cited in the file of this patent
UNITED STATES PATENTS

| | | |
|---|---|---|
| 2,072,800 | Eksergian | Mar. 2, 1937 |
| 2,449,910 | Quiring | Sept. 21, 1948 |
| 2,702,725 | Lyman | Feb. 22, 1955 |
| 2,741,490 | Chamberlin | Apr. 10, 1956 |
| 2,743,115 | Rutledge | Apr. 24, 1956 |
| 2,918,295 | Milner | Dec. 22, 1959 |